US011901800B1

(12) United States Patent
Al-Mousa

(10) Patent No.: US 11,901,800 B1
(45) Date of Patent: Feb. 13, 2024

(54) GENERATING ELECTRICITY WITH A MAGNETIC DRILL PIPE

(71) Applicant: Saudi Arabian Oil Company, Dhahran (SA)

(72) Inventor: Ahmed Abdulaziz Al-Mousa, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/903,782

(22) Filed: Sep. 6, 2022

(51) Int. Cl.
| | |
|---|---|
| *E21B 41/00* | (2006.01) |
| *H02K 7/18* | (2006.01) |
| *E21B 3/02* | (2006.01) |
| *E21B 19/16* | (2006.01) |
| *E21B 17/00* | (2006.01) |
| *E21B 15/00* | (2006.01) |
| *E21B 19/14* | (2006.01) |
| *E21B 19/24* | (2006.01) |

(52) U.S. Cl.
CPC ........... *H02K 7/1823* (2013.01); *E21B 3/022* (2020.05); *E21B 17/00* (2013.01); *E21B 19/16* (2013.01); *E21B 41/0085* (2013.01); *E21B 15/00* (2013.01); *E21B 19/14* (2013.01); *E21B 19/24* (2013.01)

(58) Field of Classification Search
CPC .... E21B 41/0085; E21B 17/00; E21B 17/003; E21B 17/028
See application file for complete search history.

(56) References Cited

U.S. PATENT DOCUMENTS

| | | |
|---|---|---|
| 8,567,529 B2 | 10/2013 | Williams |
| 8,957,538 B2 | 2/2015 | Inman et al. |
| 10,309,166 B2 | 6/2019 | Thiemann et al. |
| 11,322,942 B2 | 5/2022 | Orban et al. |
| 2016/0160641 A1* | 6/2016 | Rowe .................... E21B 49/005 250/288 |
| 2020/0408070 A1 | 12/2020 | Rouse et al. |
| 2021/0095546 A1* | 4/2021 | Angman ............. E21B 17/1078 |
| 2021/0372243 A1* | 12/2021 | Arukhe ................... F04B 17/03 |

FOREIGN PATENT DOCUMENTS

EP 0273379 2/1994

* cited by examiner

*Primary Examiner* — Kristyn A Hall
(74) *Attorney, Agent, or Firm* — Fish & Richardson P.C.

(57) ABSTRACT

A drilling rig system and a method for generating electricity with a magnetic drill pipe. The drilling rig has a rig floor, a derrick extending upwards from the rig floor, and a drive mechanism. A stator is fixed in position relative to the rig floor. At least one section of magnetic drill pipe extends through the stator. The drive mechanism is coupled and rotates the magnetic drill pipe. An electrical storage device is electrically coupled to the stator.

20 Claims, 3 Drawing Sheets

GENERATING ELECTRICITY WITH A MAGNETIC DRILL PIPE

TECHNICAL FIELD

This disclosure relates to generating electricity, in particular, by using a magnetic drill pipe in a coiled winding stator on a drilling rig floor.

BACKGROUND

Drilling rigs drill wellbores in the Earth with a drill bit attached to a bottom end of a drill string. The drill string includes drill pipe. The drilling rig passes the drill string through a rig floor to drill the wellbores. In order to drill the wellbores, the drill pipe is rotated while passing through the rig floor.

SUMMARY

This disclosure describes systems and methods related to generating electricity with a magnetic drill pipe. This approach generates electricity on a drilling rig with a magnetic drill pipe. The drilling rig has a rig floor with a derrick extending upwards from the rig floor. A stator is fixed in position relative to the rig floor. A drive mechanism is coupled to the derrick and the drill string to rotationally and axially move the drill string relative to the rig floor. The drill string has a section of magnetic drill pipe extending through the stator. An electrical storage device is electrically coupled to the stator. As the magnetic drill pipe moves relative to the stator, electricity is generated and flows to the electrical storage device. The magnetic drill pipe is a hollow section of drill pipe made from a magnetic material.

In one aspect, a drilling rig includes a rig floor, a derrick extending upwards from the rig floor, and a stator fixed in position relative to the rig floor. At least one section of magnetic drill pipe extends through the stator. The drilling rig includes a drive mechanism coupled to the at least one section of magnetic drill pipe to rotate the at least one section of magnetic drill pipe. The drilling rig includes an electrical storage device electrically coupled to the stator.

In some embodiments, the drilling rig further includes a blowout preventer coupled to a wellbore and the drilling rig is positioned to pass the at least one section of magnetic drill pipe through the blowout preventer into the wellbore. In some cases, the drilling rig further includes a bell nipple positioned on the blowout preventer.

In some embodiments, rotation of the at least one section of magnetic drill pipe relative to the stator generates a flow of electricity to the electric storage device.

In some embodiments, the electrical store device includes at least one of a battery, a fuel cell, a capacitor, a super capacitor, or an inductor.

In some embodiments, the stator is mounted on the rig floor.

In some embodiments, the drive mechanism is a top drive motor and the stator is positioned in the top drive motor.

In some embodiments, the stator includes multiple wire coils.

In some embodiments, the at least one section of magnetic drill pipe includes a stand of three thirty-foot magnetic drill pipes.

In some embodiments, the drilling rig further includes a controller operatively coupled to the stator and the electrical storage device. The controller controls a flow of electricity from the stator to the electrical storage device. In some cases, the controller controls a flow of electricity from the electrical storage device.

In some embodiments, the drilling rig further includes a bottom hole assembly coupled to a downhole end of the at least one section of magnetic drill pipe. The bottom hole assembly has a drill bit.

In another aspect, electricity is generated on a drilling rig. A method for generating electricity on the drill rig includes attaching a bottom hole assembly having a drill bit to at least one section of magnetic drill pipe. The bottom hole assembly is inserted into a wellbore. The at least one section of magnetic drill pipe is positioned through a stator fixed in position relative to a rig floor of the drilling rig. The at least one section of magnetic drill pipe is rotated relative to the stator and the bottom hole assembly in the wellbore. Simultaneously, in response to rotating the at least one section of magnetic drill pipe relative to the stator, electricity is generated and in response to rotating the bottom hole assembly, a length of the wellbore is drilled. The electricity generated by the rotation of the at least one section of magnetic drill pipe relative to the stator is stored.

In some embodiments, after generating electricity in response to rotating the at least one section of magnetic drill pipe relative to the stator, the method further includes flowing the electricity to an electric storage device.

In some embodiments, the electricity generated by rotation of the at least one section of magnetic drill pipe relative to the stator is stored in an electrical storage device. In some cases, the method further includes transmitting the electricity stored in the electrical storage device to a rig tool.

In some embodiments, the length is a first length. After drilling the length of the wellbore, the method further includes pulling the at least one section of magnetic drill pipe out of the wellbore; racking back the at least one section of magnetic drill pipe on a derrick of the drilling rig, coupling at least one section of non-magnetic drill pipe to the bottom hole assembly; running the bottom hole assembly and the at least one section of non-magnetic drill pipe into the wellbore; coupling the at least one section of magnetic drill pipe to the at least one section of non-magnetic drill pipe; running the bottom hole assembly, the at least one section of non-magnetic drill pipe, and the at least one section of magnetic drill pipe into the wellbore; and rotating the bottom hole assembly, the at least one section of non-magnetic drill pipe, and the at least one section of magnetic drill pipe to drill a second length of the wellbore.

In some embodiments, at least one section of magnetic drill pipe includes a stand of three thirty-foot magnetic drill pipes.

In some embodiments, inserting the bottom hole assembly into the wellbore further includes passing the bottom hole assembly and the at least one section of magnetic drill pipe through a blowout preventer coupled to the wellbore.

In some embodiments, inserting the bottom hole assembly into the wellbore further includes guiding the bottom hole assembly and the at least one section of magnetic drill pipe through the blowout preventer with a bell nipple positioned on the blowout preventer.

Implementations of the present disclosure can realize one or more of the following advantages. These systems and methods increase rig electrical power production. For example, the top drive of the drilling rig rotating the drill string can receive power from an electrical generator powered by an engine, such as a diesel engine or a gasoline engine. The magnetic drill pipe of the drill string can generate additional electrical power relative to the electrical generator powered by the engine alone. These systems and methods can reduce impacts to the environment. For example, less fuel in the form of diesel and gasoline may be used to generate a given quantity of electricity on the drilling rig.

These systems and methods can improve personnel and environmental safety. For example, the electrical storage device can provide an emergency source of electrical power for the drilling rig in the event the engine or electrical generator fails, becomes inoperative, or a fuel supply is interrupted. This electric storage device can be used to power rig personnel life support equipment, rig lighting, wellbore safety monitoring equipment, and wellbore control equipment in an emergency.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

The present disclosure relates to generating electricity with a magnetic drill pipe. This approach generates electricity by moving the magnetic drill pipe relative to a stator on a drilling rig. The magnetic drill pipe is a hollow section of drill pipe made from a magnetic material. The drilling rig has a rig floor with a derrick extending upwards from the rig floor. The stator is fixed in position relative to the rig floor. A drive mechanism is coupled to the derrick and the magnetic drill pipe to rotationally and axially move the magnetic drill pipe relative to the rig floor as the magnetic drill pipe extends through the stator. An electrical storage device is electrically coupled to the stator. As the magnetic drill pipe moves relative to the stator, electricity is generated and flows to the electrical storage device.

When drilling a wellbore with a drilling rig, it may be necessary to generate electricity. Electricity on a drilling rig can be used to power equipment. For example, electricity can be used to power lights, computers, communications equipment, personnel safety equipment such as detectors of poisonous gas (H$_2$S), and wellbore monitoring and control equipment, as well as drilling, logging, completion, and production tools. In some cases, electricity can be supplied to the drilling rig by a commercial electric grid. The commercial electric grid may not reach some drilling locations. For example, the drilling rig location can be in a remote location or offshore in the ocean. In some cases, electricity can be supplied to the drilling rig by an electrical generator powered by a motor, such as a diesel engine or gasoline engine. Sometimes, the electrical generator or motor can fail mechanically or the fuel supply can be interrupted. In some cases, the fuel supply to the motor can be reduced. Some electricity can be generated by moving the magnetic drill pipe relative to the stator positioned relative to the rig floor.

Figure 1:
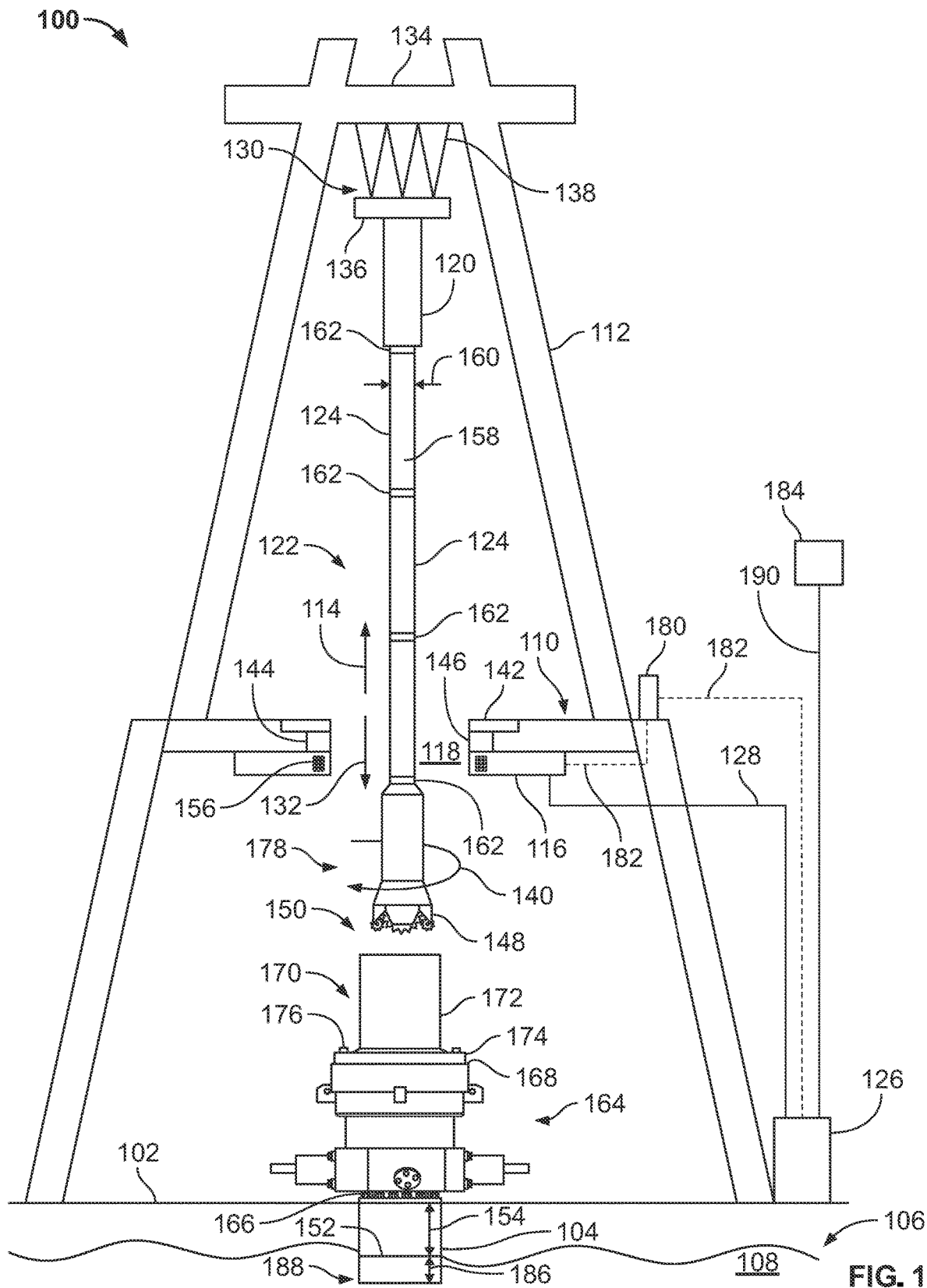
FIG. 1 is a schematic view of a drilling rig with a magnetic drill pipe in a stator.

FIG. 1 is a schematic view of drilling rig with a magnetic drill pipe in a stator. FIG. 1 is not shown to scale. Referring to FIG. 1, the drilling rig 100 is positioned on a surface 102 of the Earth 182 above a wellbore 104. The wellbore 104 extends from the surface 102 to control the flow of fluids in the form of liquids and gases such as water and hydrocarbons from sub surface geologic formations 108 to the surface 102 for production, refining, and industrial utilization. The drilling rig 100 includes a rig floor 110 with a derrick 112 extending in an upwards direction as shown by arrow 114 away from the rig floor 110. A stator 116 is positioned relative to the rig floor 110 about a void 118 passing through the rig floor 110. The drilling rig 100 has a drive mechanism 120 coupled to the derrick 112 to control the movement and operation of a drill string 122. The drill string 122 has at least one section of a magnetic drill pipe 124. The magnetic drill pipe 124 is positioned to extend through the stator 116 and the void 118 of the rig floor 110. The drilling rig 100 has an electrical storage device 126 electrically coupled to the stator 116 by a power cable 128. The electrical storage device 126 stores electricity. The drive mechanism 120 moves the magnetic drill pipe 124 through and relative to the stator 116 to generate an electrical current which flows through the power cable 128 and is stored in the electrical storage device 126 for use by the drilling rig 100.

The drilling rig 100 has a hoisting system 130 coupled between the drive mechanism 120 and the derrick 112. The hoisting system 130 operates to move the drive mechanism 120 in the upward direction as shown by arrow 114 or a downward direction as shown by an arrow 132. The downward direction of arrow 132 is relative to the rig floor 110 toward the surface 102 of the Earth 192 and the wellbore 104. The hoisting system 130 can move the drill string 122 into the wellbore 104 in the downward direction as shown by arrow 132 or out of the wellbore 104 in the upward direction as shown by arrow 114. The hoisting system 130 can include components such as a crown block 134, a traveling block 136, and cables 138 to move the drive mechanism 120 and the drill string 122 in the upward direction (arrow 114) and the downward direction (arrow 132).

The drive mechanism 120 rotates the drill string 122 and the magnetic drill pipe 124 in the direction of arrow 140 or reverse to the direction of arrow 140. The drive mechanism 120 rotating the magnetic drill pipe 124 when the magnetic drill pipe 124 is positioned in the void 118 of the stator 116 generates electricity.

As shown in FIG. 1, the drive mechanism 120 is a top drive. The top drive can be electrically powered or hydraulically powered. Alternatively, not shown, the drilling rig 100 can be a kelly or rotary rig using a kelly coupled to the drill string 122 and a kelly bushing in a rotary table 142 coupled to the rig floor 110 to rotate the magnetic drill pipe 124 and the drill string 122. In this arrangement, the drive mechanism 120 is the rotary table 142. Some top drive drilling rigs 100 can include the rotary table 142 as a backup drive mechanism 120 or for support of the drill string 122. Also, a coiled tubing rig (not shown) can include a flexible magnetic cable similar to the magnetic drill pipe 124 which can move relative to the stator 116 to generate electricity.

The drilling rig 100 can include a master bushing 144 positioned between the rotary table 142 and the stator 116 and coupled to the rig floor 110. The master bushing 144 supports the weight of the drill string 122 when slips (not shown) are used during connection operations. The rotary table 142, the master bushing 144, and the stator 116 define a surface 146 of the void 118.

The drill string 122 can include a drill bit 148 coupled to a bottom end (a downhole end) 150 of the drill string 122. When the drive mechanism 120 rotates the drill string 122 and the bottom end 150 of the drill string 122, that is, the drill bit 148, is in contact with a bottom surface 152 of the wellbore 104, the drill bit 148 extends a depth 154 of the wellbore 104.

The drill string 122 can include a bottom hole assembly 178. The drill bit 148 can be included in the bottom hole assembly 178. The bottom hole assembly 178 can include a drilling motor, a directional subassembly, a directional drilling motor, stabilizers, reamers, or logging tools.

The drilling rig 100 has a blowout preventer 164 coupled to the wellbore 104 at the surface 102 of the Earth 192. The blowout preventer 164 has a first side 166 coupled to the wellbore and a second side 168 configured to accept other drilling rig 100 components. The blowout preventer 164 controls the flow of fluid from the wellbore 104.

The drilling rig 100 has a bell nipple 170 mechanically coupled to the second side 168 of the blowout preventer 164. The bell nipple 170 aligns and guides the drill string 122 and the magnetic drill pipe 124 through the blowout preventer 164 into the wellbore 104. The bell nipple 170 has a tube 172 and a flange 174. The flange 174 couples the tube 172 of the bell nipple 170 to the blowout preventer 164 by passing fasteners 176 through the flange into the blowout preventer 164.

The stator 116 is positioned relative to the rig floor 110 about the void 118 passing through the rig floor 110. The stator 116 can be mounted on the rig floor 110. As shown in FIG. 1, the stator 116 is mounted, that is mechanically coupled to and engaged, below the rig floor 110. The stator 116 can be mounted in alternative or additional locations as described in reference to FIG. 2.

The stator 116 has multiple wire coils 156. The wire coils 156 of the stator 116 are positionally fixed relative to the magnetic drill pipe 124. In other words, the wire coils 156 of the stator 116 are stationary. When the magnetic drill pipe 124 moves through and relative to the stator 116 an electrical current is generated which flows through the power cable 128 and is stored in the electrical storage device 126 for use by the drilling rig 100. The wire coils 156 can be made from metal. For example, the wire coils 156 can be copper or any other conductive material.

The magnetic drill pipe 124 is coupled to the drive mechanism 120. The magnetic drill pipe 124 is positioned in the stator 116 and moved relative to the stator 116 by the drive mechanism 120 and the hoisting system 130. The magnetic drill pipe 124 can be moved in the upward direction (arrow 114), in the downward direction (arrow 132), rotated in the direction of arrow 140, or opposite the direction of arrow 140 (that is, clockwise or counter-clockwise) relative to the stationary stator 116 to generate electricity.

The magnetic drill pipe 124 has an outer surface 158 and an inner surface (not shown). The outer surface 158 defines an outer diameter 160 of the magnetic drill pipe 124. For example, the outer diameter 160 of the magnetic drill pipe 124 can be between one and ten inches. For example, the outer diameter 160 can be 2⅜ inches, 2⅞ inches, 3½ inches, 4½ inches, 5½ inches, or 6⅝ inches.

The inner surface has an inner diameter. The inner surface and the inner diameter define an interior void of the magnetic drill pipe 124 to flow a drilling mud (not shown) from mud pumps (not shown) of the drilling rig 100 into the drill string 122 and down into the wellbore 104.

The magnetic drill pipe 124 can include connectors 162 on the outer surface 158 and/or the inner surface to couple the magnetic drill pipe 124 to other drill string 122 or drilling rig 100 components. The connectors 162 of the magnetic drill pipe 124 can be threaded portions to mechanically couple the magnetic drill pipe 124 to other drill string 122 or drilling rig 100 components. For example, a standard American Petroleum Institute (API) connector such as a regular pin connection, a numeric connection, an internal flush connection, or a full hole connection. In some implementations, the connectors 162 are a manufacturer proprietary design. In some implementations, the connectors 162 can be a box connection, where the threads are internal to the box. The connectors 162 can have an outer diameter corresponding to a standard API connection size. For example, the connector 162 can have an outer diameter of 2⅜ inches, 2⅞ inches, 3½ inches, 4½ inches, 5½ inches, 6⅝ inches, 7⅝ inches, or 8⅝ inches.

The outer surface 158 and the inner surface of the magnetic drill pipe 124 are spaced apart by a distance. The distance that the outer surface and the inner surface are spaced apart can be referred to as a thickness or wall thickness.

The magnetic drill pipe 124 is made of a magnetic material. The magnetic drill pipe 124 can be fully metal or partially metal. For example, the magnetic drill pipe 124 can be an alloy, a matrixed material, or a composite material. The metal can be iron, nickel, cobalt, or steel. The magnetic drill pipe 124 can be manufactured by one or more processes. For example, the magnetic drill pipe 124 can be manufactured by a powder metallurgical process, a casting process, and/or a machining process.

The magnetic drill pipe 124 can be arranged as a single section (e.g., one longer piece of magnetic drill pipe 124) or multiple sections of magnetic drill pipe 124 (e.g., three sections of magnetic drill pipe 124 as shown in FIG. 1). In some cases, each of the multiple sections of magnetic drill pipe 124 are thirty-foot sections of magnetic drill pipe 124. Three thirty-foot sections of magnetic drill pipe 124 can be referred to as a stand of magnetic drill pipe 124.

The electrical storage device 126 receives the flow of electricity from the stator 116. The electrical storage device 126 can flow the electricity to a load, device, or rig tool. The electrical storage device 126 can store the electricity and at a later time then flow the electricity to a load, device, or rig tool. The electrical storage device 126 can be a battery, a fuel cell, a capacitor, a super capacitor, or an inductor. The electrical storage device 126 can supply electricity to electrical equipment 184 through a second power cable 190. For example, the electricity can be used to power lights, computers, communications equipment, personnel safety equipment such as poisonous gas ($H_2S$), wellbore monitoring and control equipment, and drilling, logging, completion, and production tools.

The drilling rig 100 has a controller 180 operatively coupled to the stator 116 and the electrical storage device 126. The controller 180 has a control cable 182 to send control signals and receive signals representing the conditions of the stator 116 and the electrical storage device 126. The controller 180 controls and monitors the flow of electricity from the stator 116 to the electrical storage device 126. The controller 180 can control the flow of electricity from the electrical storage device 126 to the electrical equipment 184. The controller 180 can include various sensors (not shown) to monitor the conditions of the stator 116 and the electrical storage device 126. For example, the controller 180 can include sensors and meters to measure amperage, voltage, a capacitance, and resistance of the stator 116, the power cable 128, the control cable 182, the electrical storage device 126, and/or the electrical equipment 184. The controller 180 can include switches (not shown) to control the flow of from the stator 116 to the electrical storage device 126 and control the flow of electricity from the electrical storage device 126 to the electrical equipment 184.

The controller 180 can include various forms of digital computers, such as printed circuit boards (PCB), processors, digital circuitry, or otherwise parts of a fracture geometry mapping system. Additionally the system can include portable storage media, such as Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 180 can include a processor, a memory, a storage device, and an input/output device which can be interconnected using a system bus. The processor is capable of processing instructions for execution within the controller 180. The processor may be designed using any of a number of architectures. For example, the processor may be a CISC (Complex Instruction Set Computers) processor, a RISC (Reduced Instruction Set Computer) processor, or a MISC (Minimal Instruction Set Computer) processor.

In one implementation, the processor is a single-threaded processor. In another implementation, the processor is a multi-threaded processor. The processor is capable of processing instructions stored in the memory or on the storage device to display graphical information for a user interface on the input/output device.

The memory stores information within the controller 180. In one implementation, the memory is a computer-readable medium. In one implementation, the memory is a volatile memory unit. In another implementation, the memory is a non-volatile memory unit.

The storage device is capable of providing mass storage for the controller. In one implementation, the storage device is a computer-readable medium. In various different implementations, the storage device may be a floppy disk device, a hard disk device, an optical disk device, or a tape device.

The input/output device provides input/output operations for the controller 180. In one implementation, the input/output device includes a keyboard and/or pointing device. In another implementation, the input/output device includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

Figure 2:
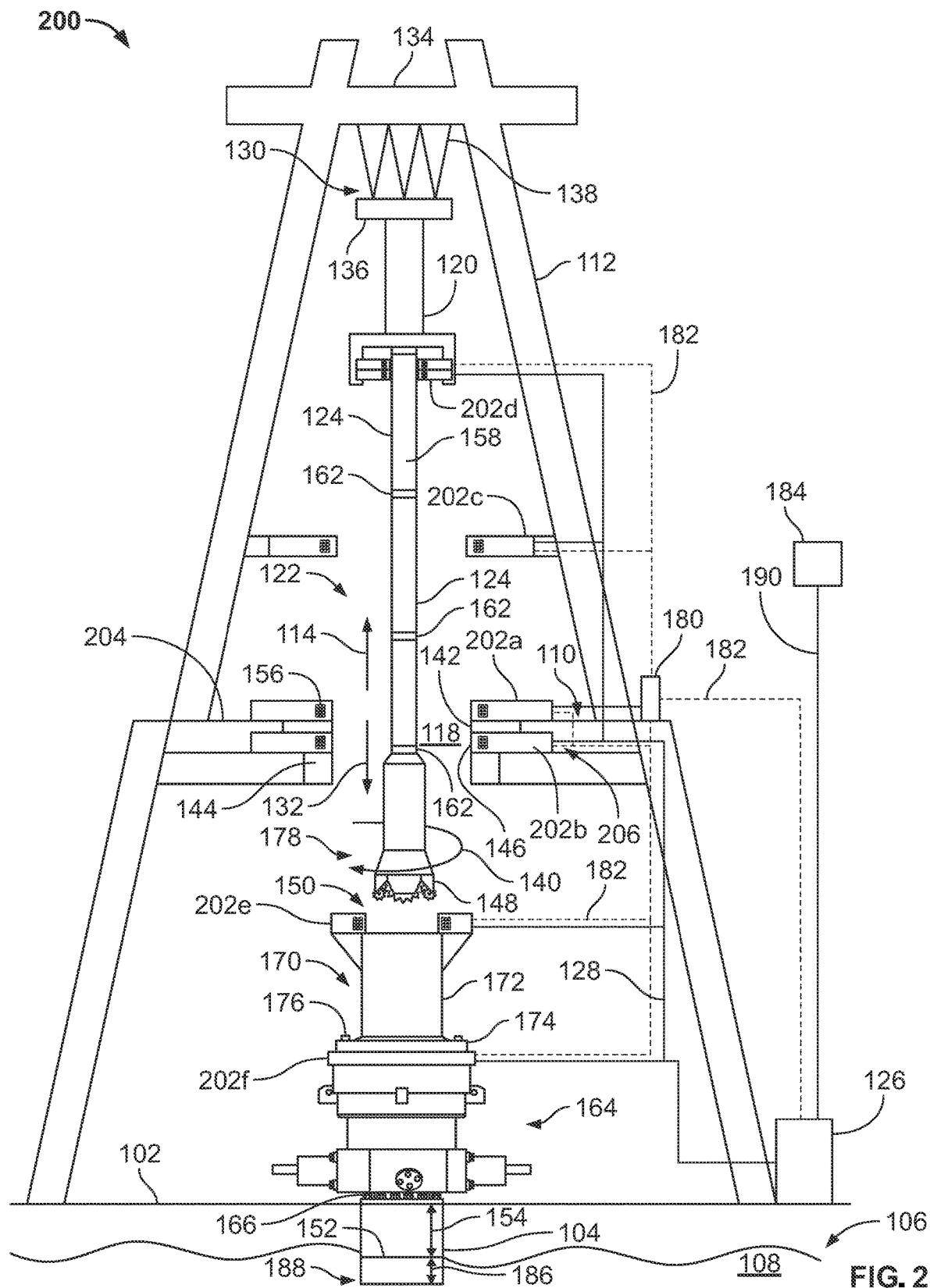
FIG. 2 is a schematic view of a drilling rig with a magnetic drill pipe in a stator mounted in alternative locations.

FIG. 2 is a schematic view of a drilling rig with a magnetic drill pipe in a stator mounted in alternative locations. FIG. 2 is not shown to scale. FIG. 2 shows a drilling rig 200, which is generally similar to the drilling rig 100 previously described. The drilling rig 200 shows stators coupled in additional or alternative locations. The stators are positioned relative to the rig floor 110 about the void 118 passing through the rig floor 110. The stators described in reference to FIG. 2 are generally similar to the stator 116.

In one implementation, a stator 202a is mounted on a top surface 204 of the rig floor 110. Alternatively or in addition, a stator 202b can be positioned inside 206 the rig floor 110. In another implementation, a stator 202c is positioned above the rig floor 110. In such an example, the stator 202c can be opened and closed around the magnetic drill pipe 124 or removed between each connection. In yet another embodiment, a stator 202d is coupled to and extending from the drive mechanism 120 in the downward direction (arrow 132), that is, down from the top drive. In another implementation, a stator 202e is coupled to the bell nipple 170. In another implementation, a stator 202f is mounted between the bell nipple 170 and the blowout preventer 164. Also, a stator (not shown) can be coupled below the rotary table 142 and attached to the rig floor 110.

Figure 3:
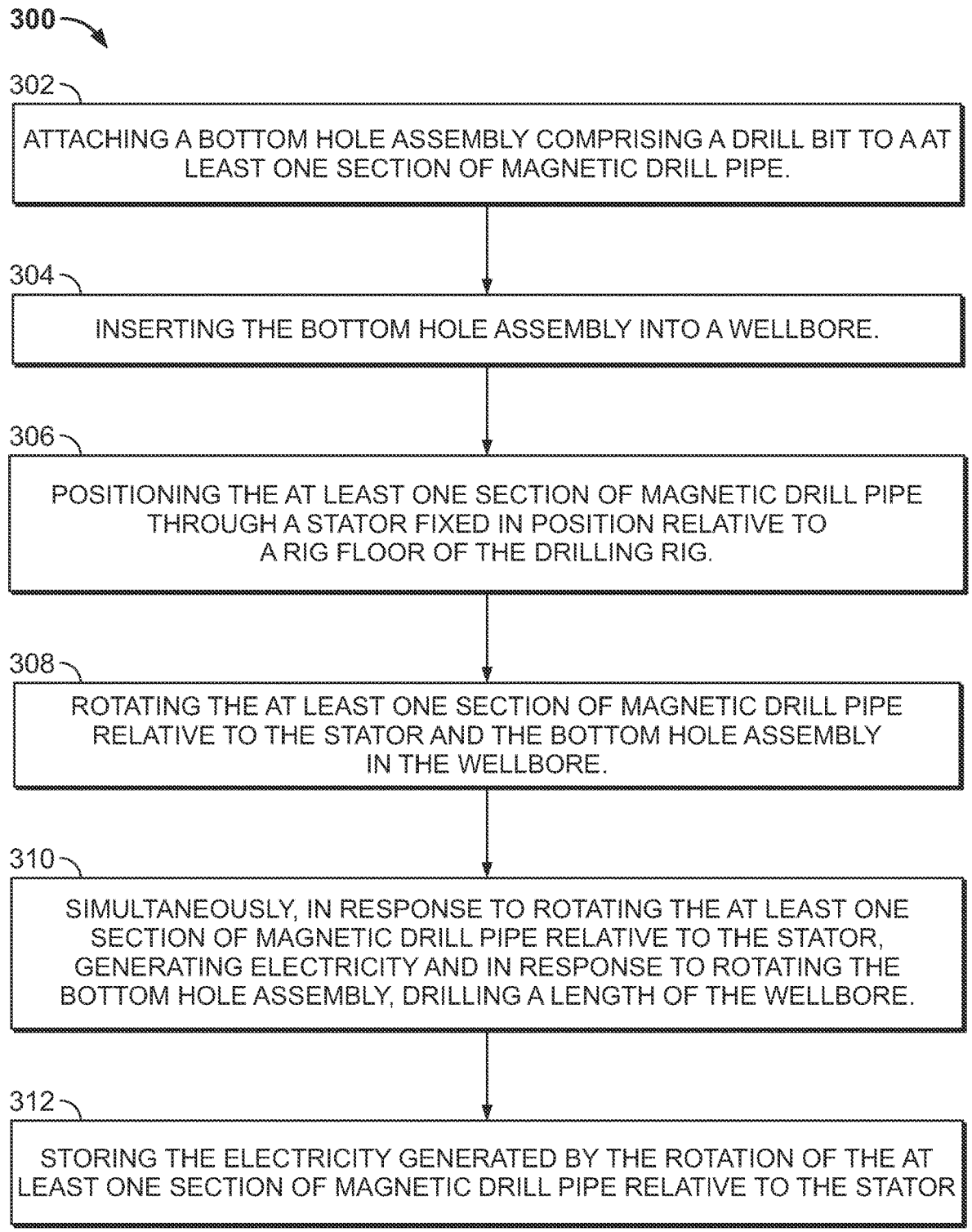
FIG. 3 is a flow chart of an example method of generating electricity with a magnetic drill pipe.

FIG. 3 is a flow chart 300 of an example method of generating electricity on a drilling rig according to the implementations of the present disclosure. At 302, a bottom hole assembly having a drill bit is attached to at least one section of magnetic drill pipe. For example, the drill bit 148 can be mechanically coupled to the bottom hole assembly 178 and then the bottom hole assembly 178 can be coupled to one or more magnetic drill pipes 124.

In some cases, the at least one section of magnetic drill pipe includes a stand of three thirty-foot magnetic drill pipes. For example, three magnetic drill pipes 124, each thirty feet long, can be rotated together to make a ninety-foot stand of magnetic drill pipe 124.

At 304, the bottom hole assembly is inserted into a wellbore. For example, the hoisting system 130 can operates to move the drive mechanism 120 in the downward direction as shown by an arrow 132 by moving the traveling block 136 relative to the crown block 134 along the cables 138 to move the drive mechanism 120 and the drill string 122 including the bottom hole assembly 178, the drill bit 148, and other drill pipe in the downward direction (arrow 132) toward and into the wellbore 104.

Inserting the bottom hole assembly into the wellbore can include passing the bottom hole assembly and the at least one section of magnetic drill pipe through a blowout preventer coupled to the wellbore. For example, the bottom hole assembly 178 and one or more magnetic drill pipes 124 can pass through the stator 116 and the void 118 through the blowout preventer 164 as the wellbore 104 is drilled.

Inserting the bottom hole assembly into the wellbore can include guiding the bottom hole assembly and the at least one section of magnetic drill pipe through the blowout preventer with a bell nipple positioned on the blowout preventer. For example, the bell nipple 170 can guide the drill bit 148, the bottom hole assembly 178, and one or more magnetic drill pipes 124 into the blowout preventer 164.

At 306, the at least one section of magnetic drill pipe is positioned through a stator fixed in position relative to a rig floor of the drilling rig. For example, the hoisting system 130 can operate to position the magnetic drill pipe 124 in the stator 116 by moving the traveling block 136 relative to the crown block 134 along the cables 138 to move the magnetic drill pipe 124 through the void 118 of the stator 116.

At 308, the at least one section of magnetic drill pipe is rotated relative to the stator and the bottom hole assembly in the wellbore. For example, the drive mechanism 120 can rotate the magnetic drill pipe 124 as the stator 116 is stationary and fixed on the rig floor 110. Additionally, when the bottom hole assembly 178 is positioned in the wellbore and the drive mechanism 120 operates to rotate the drill string and the bottom hole assembly 178 in the wellbore 104.

At 310, simultaneously, in response to rotating the at least one section of magnetic drill pipe relative to the stator, electricity is generated and in response to rotating the bottom hole assembly, a length of the wellbore is drilled. For example, when the magnetic drill pipe 124 is in the void 118 of the stator 116 and is rotated in the direction of arrow 140, electricity is generated in the wire coils 156 of the stator 116. Additionally, when the drill bit 148 is engaged to the bottom surface 152 of the wellbore 104 and the bottom hole assembly 178 is rotated in the direction of arrow 140, a length 186, that is a portion 188 of the Earth 192 is drilled, extending the length 154 of the wellbore 104.

After drilling the length of the wellbore, where the length is a first length, a second length of the wellbore can be drilled by pulling the at least one section of magnetic drill pipe out of the wellbore; racking back the at least one section of magnetic drill pipe on a derrick of the drilling rig; coupling at least one section of non-magnetic drill pipe to the bottom hole assembly; running the bottom hole assembly and the at least one section of non-magnetic drill pipe into the wellbore; coupling the at least one section of magnetic drill pipe to the at least one section of non-magnetic drill pipe; running the bottom hole assembly, the at least one section of non-magnetic drill pipe, and the at least one section of magnetic drill pipe into the wellbore; and the bottom hole assembly, the at least one section of non-magnetic drill pipe, and the at least one section of magnetic drill pipe to drill a second length of the wellbore. For example, the drill bit 148 can drill the depth 154, which can be the first length. Then, the hoisting system 130 can be operated to remove the magnetic drill pipe 124 from the wellbore to a position above the rig floor 110. The magnetic drill pipe 124 can be racked back and placed on the derrick 112. An additional section of drill pipe (nonmagnetic) can be picked up and coupled to the drill string 122 and moved in the downward direction 132 toward and/or into the wellbore 104. The magnetic drill pipe 124 can then be picked up and coupled to the drill string 122 and the drive mechanism 120, which can them be move into the wellbore 104 to drill the portion 188 corresponding to the length 186, the second length of the wellbore 104.

At 312, the electricity generated by the rotation of the at least one section of magnetic drill pipe relative to the stator is stored. For example, the electricity can be stored in the electrical storage device 126.

After generating electricity in response to rotating the at least one section of magnetic drill pipe relative to the stator, the electricity can be flowed to an electric storage device. For example, the electricity can flow from the stator 116 through the power cable 128 to the electric storage device 126.

After the electricity is generated by rotation of the at least one section of magnetic drill pipe relative to the stator, the electricity can be stored in an electrical storage device. For example, the electricity can be stored in the electrical storage device 126.

The electricity stored in the electrical storage device can be transmitted from the electrical storage device to a rig tool. For example, the electricity stored in the electric storage device 126 can be supplied to the electrical equipment 184 through the second power cable 190.

Although the following detailed description contains many specific details for purposes of illustration, it is understood that one of ordinary skill in the art will appreciate that many examples, variations, and alterations to the following details are within the scope and spirit of the disclosure. Accordingly, the example implementations described herein and provided in the appended figures are set forth without any loss of generality, and without imposing limitations on the claimed implementations.

Although the present implementations have been described in detail, it should be understood that various changes, substitutions, and alterations can be made hereupon without departing from the principle and scope of the disclosure. Accordingly, the scope of the present disclosure should be determined by the following claims and their appropriate legal equivalents.

The invention claimed is:

1. A drilling rig comprising:
a rig floor;
a derrick extending upwards from the rig floor;
a stator coupled to the drilling rig and fixed in position relative to the rig floor;
at least one section of magnetic drill pipe extending through the stator, the stator configured to generate electricity responsive to a movement of the magnetic drill pipe;
a drive mechanism coupled to the at least one section of magnetic drill pipe to rotate the at least one section of magnetic drill pipe; and
an electrical storage device electrically coupled to the stator.

2. The drilling rig of claim 1, further comprising a blowout preventer coupled to a wellbore, wherein the drilling rig is positioned to pass the at least one section of magnetic drill pipe through the blowout preventer into the wellbore.

3. The drilling rig of claim 2, further comprising a bell nipple positioned on the blowout preventer.

4. The drilling rig of claim 1, wherein rotation of the at least one section of magnetic drill pipe relative to the stator generates a flow of electricity to the electric storage device.

5. The drilling rig of claim 1, wherein the electrical store device comprises at least one of a battery, a fuel cell, a capacitor, a super capacitor, or an inductor.

6. The drilling rig of claim 1, wherein the stator is mounted on the rig floor.

7. The drilling rig of claim 1, wherein the drive mechanism is a top drive motor and the stator is positioned in the top drive motor.

8. The drilling rig of claim 1, wherein the stator comprises a plurality of wire coils.

9. The drilling rig of claim 1, wherein the at least one section of magnetic drill pipe comprises a stand of three thirty-foot magnetic drill pipes.

10. The drilling rig of claim 1, further comprising a controller operatively coupled to the stator and the electrical storage device, the controller configured to control a flow of electricity from the stator to the electrical storage device.

11. The drilling rig of claim 10, wherein the controller is further configured to control a flow of electricity from the electrical storage device.

12. The drilling rig of claim 1, further comprising a bottom hole assembly coupled to a downhole end of the at least one section of magnetic drill pipe, the bottom hole assembly comprising a drill bit.

13. A method for generating electricity on a drilling rig, the method comprising:
attaching a bottom hole assembly comprising a drill bit to at least one section of magnetic drill pipe;
inserting the bottom hole assembly into a wellbore;
positioning the at least one section of magnetic drill pipe through a stator coupled to the drilling rig and fixed in position relative to a rig floor of the drilling rig;
rotating the bottom hole assembly and the at least one section of magnetic drill pipe relative to the stator fixed in position relative to the rig floor;
simultaneously, in response to rotating the at least one section of magnetic drill pipe relative to the stator, generating electricity and in response to rotating the bottom hole assembly, drilling a length of the wellbore; and
storing the electricity generated by the rotation of the at least one section of magnetic drill pipe relative to the stator.

14. The method of claim 13, after generating electricity in response to rotating the at least one section of magnetic drill pipe relative to the stator, the method further comprises flowing the electricity to an electric storage device.

15. The method of claim 13, wherein the electricity generated by rotation of the at least one section of magnetic drill pipe relative to the stator is stored in an electrical storage device.

16. The method of claim 15, further comprising transmitting the electricity stored in the electrical storage device to a rig tool.

17. The method of claim 13, after drilling the length of the wellbore, wherein the length is a first length, the method further comprises:
pulling the at least one section of magnetic drill pipe out of the wellbore;
racking back the at least one section of magnetic drill pipe on a derrick of the drilling rig;
coupling at least one section of non-magnetic drill pipe to the bottom hole assembly;
running the bottom hole assembly and the at least one section of non-magnetic drill pipe into the wellbore;
coupling the at least one section of magnetic drill pipe to the at least one section of non-magnetic drill pipe;
running the bottom hole assembly, the at least one section of non-magnetic drill pipe, and the at least one section of magnetic drill pipe into the wellbore; and
rotating the bottom hole assembly, the at least one section of non-magnetic drill pipe, and the at least one section of magnetic drill pipe to drill a second length of the wellbore.

18. The method of claim 13, wherein at least one section of magnetic drill pipe comprises a stand of three thirty-foot magnetic drill pipes.

19. The method of claim 13, wherein inserting the bottom hole assembly into the wellbore further comprises passing the bottom hole assembly and the at least one section of magnetic drill pipe through a blowout preventer coupled to the wellbore.

20. The method of claim 19, wherein inserting the bottom hole assembly into the wellbore further comprises guiding the bottom hole assembly and the at least one section of magnetic drill pipe through the blowout preventer with a bell nipple positioned on the blowout preventer.

* * * * *

UNITED STATES PATENT AND TRADEMARK OFFICE
CERTIFICATE OF CORRECTION

| | |
|---|---|
| PATENT NO. | : 11,901,800 B1 |
| APPLICATION NO. | : 17/903782 |
| DATED | : February 13, 2024 |
| INVENTOR(S) | : Ahmed Abdulaziz Al-Mousa |

It is certified that error appears in the above-identified patent and that said Letters Patent is hereby corrected as shown below:

In the Claims

In Column 11, Line 26, Claim 5, please replace "store" with -- storage --

Signed and Sealed this
Second Day of April, 2024

Katherine Kelly Vidal
*Director of the United States Patent and Trademark Office*